Patented Nov. 1, 1927.

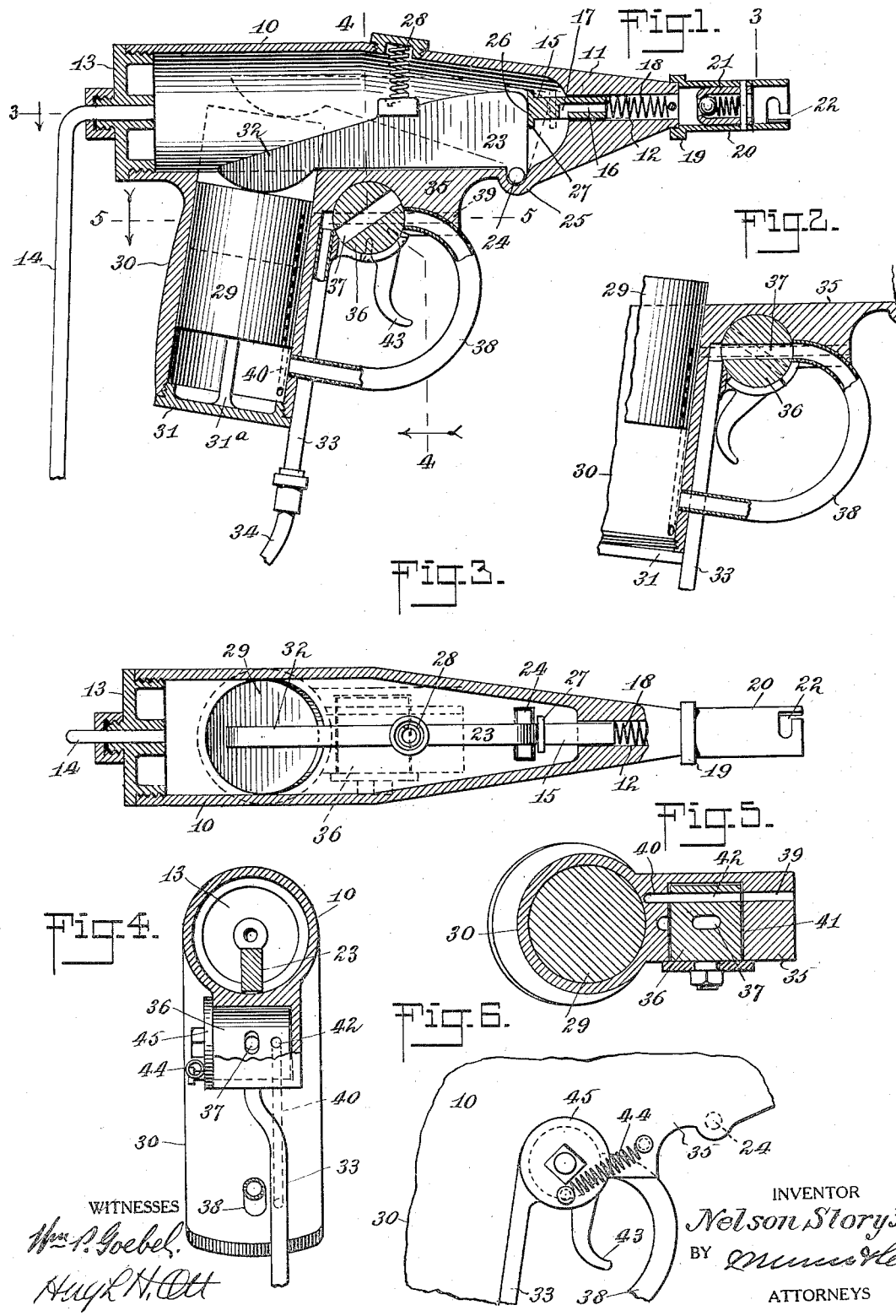
Nov. 1, 1927.
N. STORY, 3D
1,647,941
GREASE GUN
Filed June 8, 1926

1,647,941

UNITED STATES PATENT OFFICE.

NELSON STORY, 3D, OF BOZEMAN, MONTANA.

GREASE GUN.

Application filed June 8, 1926. Serial No. 114,530.

This invention relates to lubricating devices and pertains to certain improvements in what are known as "grease guns" for feeding lubricant under pressure to the bearings or other parts to be lubricated.

One of the outstanding objects of the present invention is to provide a simple, inexpensive and convenient device for economically feeding lubricant under pressure to the parts to be lubricated.

The invention furthermore comprehends an improved grease gun which greatly facilitates the operation of supplying the lubricant without undue waste or over-feeding.

More specifically, the invention comprehends a lubricating device which includes a hollow body constantly filled with a supply of lubricant under a normal relatively low pressure, which body is provided with a valved outlet nozzle closed against the escape of the lubricant under said normal pressure, with means for causing an increase in the normal pressure, whereby to effect the discharge of predetermined quantities of lubricant.

With the above recited and other objects in view, reference is had to the following specification and accompanying drawings in which there is exhibited one example or embodiment of the invention which is in no way intended as a limitation upon the scope of the appended claims as it is to be clearly understood that variations and modifications which properly fall within the scope of said claims may be resorted to when found expedient.

In the drawings—

Figure 1 is a longitudinal sectional view through a grease gun constructed in accordance with the invention and illustrating the position of parts when the same are in normal inactive condition;

Fig. 2 is a fragmentary longitudinal sectional view illustrating the manually controlled means moved to a position for actuating the gun;

Fig. 3 is a horizontal sectional view taken approximately on the line 3—3 of Fig. 1;

Fig. 4 is a transverse sectional view taken approximately on the line 4—4 of Fig. 1;

Fig. 5 is a horizontal sectional view taken approximately on the line 5—5 of Fig. 1;

Fig. 6 is a fragmentary side view illustrating the trigger structure.

Referring to the drawings by characters of reference, the grease gun comprises a substantially hollow cylindrical body 10 having a reduced end 11 formed with an outlet bore 12 and constituting an outlet nozzle. The opposite end is provided with a removable closure cap 13 through which extends a lubricant conduit pipe 14 leading from a series of lubricant supply. A plunger valve 15 is mounted in the inner end of the bore 12 of the outer end or nozzle 11, the plunger valve being provided with an axial bore 16 extending inwardly from its outer end and communicating with the radial port 17 intermediate its ends. The plunger valve is normally forced inwardly and tensioned against outward movement by a coiled expansion spring 18 interposed between the outer end of the plunger valve and a suitable abutment pin 19. The outer end of the nozzle carries and communicates with a nipple 20 within which a normally closed outwardly opening and inwardly closing check valve 21 is arranged. The nipple may further be provided with a bayonet slot or other similar coupling means 22 for attaching the nipple of the gun to a suitable complementary receiving device mounted on the part to be lubricated. The lubricant is supplied to the interior of the body 10 and maintained under a normal relatively low pressure slightly in excess of atmospheric pressure, while the tension on the check valve 21 is slightly greater than said normal internal pressure for preventing escape of the lubricant.

In order to provide convenient means for facilitating the discharge of a predetermined quantity of the lubricant from the gun body, a rock lever 23 is fulcrumed within the body 10 by means of trunnions 24 disposed in a bearing recess 25, one end 26 of the rock lever engaging the headed inner end 27 of the plunger valve 15 and serving when the rock lever is in normal position to limit the inward movement of the plunger valve so that the radial port 17 is disposed in communication with the interior of the body 10. The lever is swung downwardly to its normal position by means of a spring 28, and the means for rocking the lever upwardly to cause its end 26 to move the plunger valve outwardly in the bore 12 against the action of the springs 18 and 28, consists of a plunger or piston 29 freely mounted for movement in a plunger cylinder 30 depending from the body 10 and having an open inner end communicating with the same. The outer end is closed by a cylinder head 31 and suitable means, such as a projection 31ª formed on the cylinder head, limits the outward movement of the plunger or piston 29 and normally spaces the same from the outer closed end of the cylinder. The rock lever 23 has its free end 32 projecting into the inner open end of the cylinder 30 and engaging with the piston or plunger 29, so that upon inward movement of the piston or plunger, the rock lever is swung upwardly to perform its function.

Compressed air or other similar fluid force is employed for moving the piston or plunger 29 inwardly and the means for introducing the compressed air preferably consists of a conduit pipe 33 connected by a flexible hose 34 to a source of supply, the pipe 33 leading upwardly alongside the forward portion of the cylinder 30 to a valve casing 35 which preferably forms an integral depending part or boss of the body 10. A rotary valve core 36 is mounted in the valve casing 35, and is provided with a passage 37 which upon turning movement of the valve core is adapted to respectively establish and cut off communication between the pipe 33 and a pipe section 38, which leads from the valve casing to the cylinder 30 adjacent its outer end and beyond the outermost limit of movement of the piston or plunger 29.

The valve casing is also provided with alined discharge ports 39 and 40, the former leading from the bore 41 in which the valve core is mounted, to the atmosphere, and the latter leading from said bore to the cylinder at a point between the outermost limit of movement of the piston and the head 30. The valve core is provided with a second passageway 42 disposed at an angle to the passageway 37 and constituting a discharge passageway which is designed to register with the passageways 39 and 40 for establishing communication therebetween when the feed passageway 37 is out of registry. The valve core has attached thereto a trigger 43 adapted for limited movement and designed to effect movement of the valve core in one direction, by pulling the trigger toward the cylinder 30, which cylinder is also in the nature of a hand grip. The valve core 36 and trigger are normally moved and held in the opposite direction under tension, by a spring 44, which is suitably connected at one end to a closure disk 45 keyed to the valve core and attached at its opposite end to the valve casing.

In use and operation, the gun body is constantly maintained filled with grease or other lubricant through the conduit 14, which is maintained under a pressure in excess of atmospheric pressure and which, for the purpose of illustration, will be assumed to be twenty pounds. The check valve 21 is maintained seated under a tension slightly in excess of twenty pounds so that when the valve 36 is in the position illustrated in Fig. 1, the lubricant will be prevented from discharging through the nozzle from the body. It is obvious that the grease or lubricant will fill the nozzle up to the check valve 21, gaining access thereto through the port 17 and passage 16 in the plunger valve 15.

When the lubricant is to be discharged, the operator grasping the cylinder 30 in the manner of the hand grip of a pistol and pulling the trigger 43 rearwardly against the action of the spring 44 turns the valve core 36 to the position illustrated in Fig. 2, where the passageway 37 establishes communication between the air supply pipe 33 and the pipe section 38. This causes compressed air of a pressure in excess of the normal pressure of the lubricant in the body, which, by way of example, will be assumed to be one hundred pounds, to enter the cylinder 30 between the outer end of the piston or plunger 29 and the head 31. The piston or plunger will move inwardly thereby simultaneously increasing the internal pressure of the lubricant contained in the body and swinging the rock lever 23 upwardly so that its forward end 26 will move the plunger valve 15 outwardly. The initial outward movement of the plunger valve will close the port 17 and will force the lubricant trapped within the nozzle between the plunger valve and the check valve past the check valve and into the receiving device to which the nipple has previously been attached. When the pull on the trigger 43 is released, the spring 44 will return the trigger and valve core 36 to the normal position illustrated in Fig. 1 so that the passageway 37 will be disposed out of registry with the air supply pipe 33 and pipe section 38 to cut off the air supply to the cylinder. At the same time, the passageway 42 will again establish communication between the discharge ports 39 and 40, permitting the exhaust of the compressed air within the cylinder so that the springs 18 and 28 will respectively move the valve plunger 15 and the rock lever 23 to their normal positions, thus bringing the port 17 of the plunger valve into communication with the body 10 for receiving a further charge of lubricant.

From the foregoing it will be seen that a comparatively simple and inexpensive yet highly efficient grease gun has been set forth for economically feeding a lubricant to the parts to be lubricated, which is so constructed as to render the same convenient to handle and manipulate.

What is claimed is:

1. A grease gun, including a hollow body adapted to receive a constant supply of grease under pressure, a nozzle at one end of the body having an inwardly forced normally open plunger valve and an outwardly opening normally closed check valve tensioned in excess of the normal lubricant pressure, and manually operated means for moving the plunger valve outwardly to respectively close the same and force therefrom the quantity of grease trapped in the nozzle, through said check valve, said means consisting of a rock lever engaging the inner end of the plunger valve, a plunger cylinder open at one end of the gun body and having a closed outer end, a plunger in the cylinder, and means for introducing a fluid pressure in excess of the normal lubricant pressure to the cylinder between the closed end and the outer end of the plunger for effecting the inward movement of the plunger and rocking of the rock lever.

2. A grease gun, comprising a hollow body having an outlet nozzle, a plunger valve in the nozzle having a grease passage, means for normally moving the plunger valve inwardly to a position for establishing communication between the interior of the body and the nozzle, a normally closed inwardly closing and outwardly opening check valve, a grease feed conduit leading to and communicating with the interior of the gun body, a plunger cylinder open to the body at one end and closed at its opposite end, a plunger in the plunger cylinder, a compressed air supply conduit communicating with the closed end of the cylinder for forcing the plunger inwardly, an exhaust passage communicating with the closed end of the cylinder, a common manipulating operable valve means normally disposed in a position to respectively cut off the compressed air supply to the plunger cylinder and to open the exhaust passage to the atmosphere, and serving when manipulated to close the exhaust passage and open the compressed air supply to the plunger cylinder, a rock lever fulcrumed in the body having one end engaging the plunger valve and the opposite end disposed in the path of initial movement of the plunger, whereby when the plunger moves inwardly, outward movement of the plunger valve is effected to cut off communication between the nozzle and body and to effect a discharge of the grease from the nozzle through the check valve.

NELSON STORY, III.